(12) United States Patent
Davenport et al.

(10) Patent No.: US 10,414,365 B2
(45) Date of Patent: Sep. 17, 2019

(54) BUMPER COVER RETAINERS INCLUDING INTEGRAL ATTACHMENTS THAT RETAIN A BUMPER COVER TO THE BUMPER COVER RETAINER

(71) Applicant: Toyota Motor Engineering & Manufacturing North America, Inc., Erlanger, KY (US)

(72) Inventors: Cory S. Davenport, Lincoln Park, MI (US); Nora Arellano, Lincoln Park, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 32 days.

(21) Appl. No.: 15/823,187

(22) Filed: Nov. 27, 2017

(65) Prior Publication Data

US 2019/0161040 A1 May 30, 2019

(51) Int. Cl.
| | |
|---|---|
| *B60R 19/04* | (2006.01) |
| *B60R 19/30* | (2006.01) |
| *B60R 19/44* | (2006.01) |
| *F16B 5/06* | (2006.01) |
| *B60R 13/04* | (2006.01) |

(52) U.S. Cl.
CPC .............. *B60R 19/30* (2013.01); *B60R 13/04* (2013.01); *B60R 19/44* (2013.01); *F16B 5/0664* (2013.01)

(58) Field of Classification Search
CPC ... B60R 19/30; B60R 19/44; B60R 2019/247; B60R 2019/1886; B60R 13/04; F16B 5/0664
See application file for complete search history.

(56) References Cited

U.S. PATENT DOCUMENTS

| | | | |
|---|---|---|---|
| 4,875,728 A | 10/1989 | Copp et al. | |
| 6,233,792 B1* | 5/2001 | Kanie | B60R 19/24 24/289 |
| 8,877,113 B2 | 11/2014 | Ishizu et al. | |
| 2002/0089197 A1* | 7/2002 | Muramatsu | B60R 19/24 293/155 |
| 2005/0093310 A1* | 5/2005 | Lee | B60R 19/24 293/155 |
| 2005/0190573 A1* | 9/2005 | Schwab | B60Q 1/0491 362/549 |
| 2007/0204660 A1* | 9/2007 | Nakayama | B60R 13/04 70/208 |
| 2008/0100095 A1* | 5/2008 | Rogner | B05B 13/0292 296/187.01 |
| 2011/0304168 A1* | 12/2011 | Muller | B60R 19/023 296/1.08 |
| 2012/0074283 A1 | 3/2012 | Tanno | |
| 2013/0285396 A1* | 10/2013 | Herve | B60Q 1/0441 293/102 |

(Continued)

FOREIGN PATENT DOCUMENTS

JP 5708436 4/2015

*Primary Examiner* — Gregory A Blankenship
(74) *Attorney, Agent, or Firm* — Dinsmore & Shohl LLP

(57) ABSTRACT

A vehicle may include a bumper assembly that includes a bumper cover, and a bumper cover retainer. The bumper cover retainer may further include an integrally formed fastening feature that is integral with the bumper cover retainer and that folds over the bumper cover to connect the bumper cover to the bumper cover retainer.

20 Claims, 5 Drawing Sheets

(56) References Cited

U.S. PATENT DOCUMENTS

| | | | |
|---|---|---|---|
| 2015/0298632 A1* | 10/2015 | Chiba | B60R 13/04 |
| | | | 296/1.08 |
| 2015/0353041 A1* | 12/2015 | Kojima | F16B 5/0664 |
| | | | 293/155 |
| 2016/0214516 A1 | 7/2016 | Kheil et al. | |
| 2017/0334372 A1* | 11/2017 | Wicks | B60R 13/04 |
| 2019/0009741 A1* | 1/2019 | Nagane | B60R 19/24 |

* cited by examiner

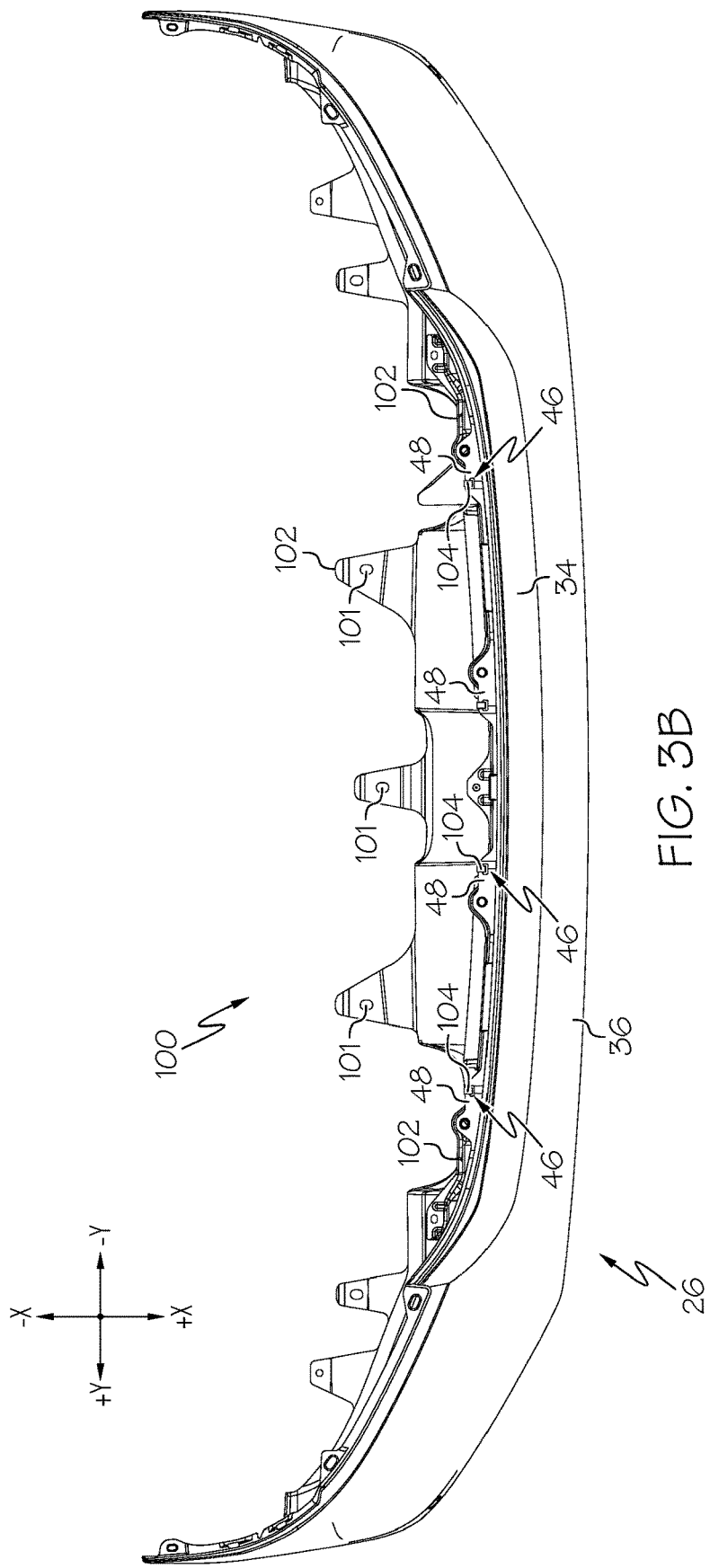

BUMPER COVER RETAINERS INCLUDING INTEGRAL ATTACHMENTS THAT RETAIN A BUMPER COVER TO THE BUMPER COVER RETAINER

TECHNICAL FIELD

The present specification generally relates to bumper assemblies and vehicles having bumper assemblies and, more specifically to bumper cover retainers including integral attachments that retain a bumper cover to the bumper cover retainer.

BACKGROUND

Vehicles may be equipped with bumper assemblies and impact protection structures that generally extend from the front of the vehicle and elastically and plastically deform to absorb energy in the event of an impact. A number of mechanisms and methods for connecting a bumper assembly and components thereof to the front-end or other features of the vehicle currently exist. One example is an attachment between a bumper cover and a bumper cover retainer. Current methods may provide separately formed attachments that retain the bumper cover to the bumper cover retainer. However, these attachments may be loose components that can provide challenges during an assembly process. Accordingly, there is a need for integral attachments that retain a bumper cover to a bumper cover retainer.

SUMMARY

In one embodiment a vehicle may include a bumper assembly that includes a bumper cover and a bumper cover retainer. The bumper cover retainer may include an integrally formed fastening feature that is integral with the bumper cover retainer and that folds over the bumper cover to connect the bumper cover to the bumper cover retainer.

In another embodiment, a bumper assembly includes a bumper cover and a bumper cover retainer. The bumper cover retainer may further include an integrally formed fastening feature that is integral with the bumper cover retainer and that folds over the bumper cover to connect the bumper cover to the bumper cover retainer.

In yet another embodiment, a method of retaining a bumper cover to a bumper cover retainer that includes an integrally formed fastening feature that is integral with the bumper cover retainer includes multiple steps. The steps may include placing the bumper cover and the bumper cover retainer in contact and folding the integrally formed fastening feature over the bumper cover to connect the bumper cover to the bumper cover retainer.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3B schematically depicts a top view of the front bumper assembly of FIG. 3A, according to one or more embodiments shown and described herein;

DETAILED DESCRIPTION

Vehicles according to the present specification include a frame and front end assembly that includes a front bumper assembly with a bumper cover and a bumper cover retainer. The bumper cover and the bumper cover retainer may extend in a vehicle-lateral direction across the front end assembly. The bumper cover retainer may be disposed behind the bumper cover and may fasten the bumper cover to the front bumper assembly. The bumper cover retainer may include one or more features for fastening the bumper cover to the bumper cover retainer using one or more integrally formed fastening features. The one or more integrally formed fastening features may be integral with the bumper cover retainer and foldable from an extended position to an inserted position. The one or more fastening features may also comprise one or more features for selectively preventing removal of the fastening feature that may inhibit unintended removal of the fastening feature and thus prevent unintended decoupling of the bumper cover retainer and the bumper cover. Thus, vehicles according to the present disclosure may provide a convenient, practical, and cost-effective feature for joining various components of the vehicle while it is being assembled, saving time and money.

In the embodiments described herein, the phrase "vehicle-longitudinal direction" refers to the forward-rearward direction (i.e., the +/−x direction of the coordinate axes in the figures). The phrase "vehicle-vertical direction" refers to the upward-downward direction (i.e., the +/−z direction of the coordinate axes in the figures). The phrase "vehicle-lateral direction" refers to the left-right direction (i.e., the +/−y direction of the coordinate axes in the figures). Further, the terms "inboard" and "outboard" are used to describe the relative positioning of various components of the vehicle with respect to a centerline of the vehicle. Motor vehicles that incorporate elements according to the present disclosure may include a variety of construction methodologies that are conventionally known, including the unibody construction methodology as well as a body-on-frame construction methodology.

Figure 1:
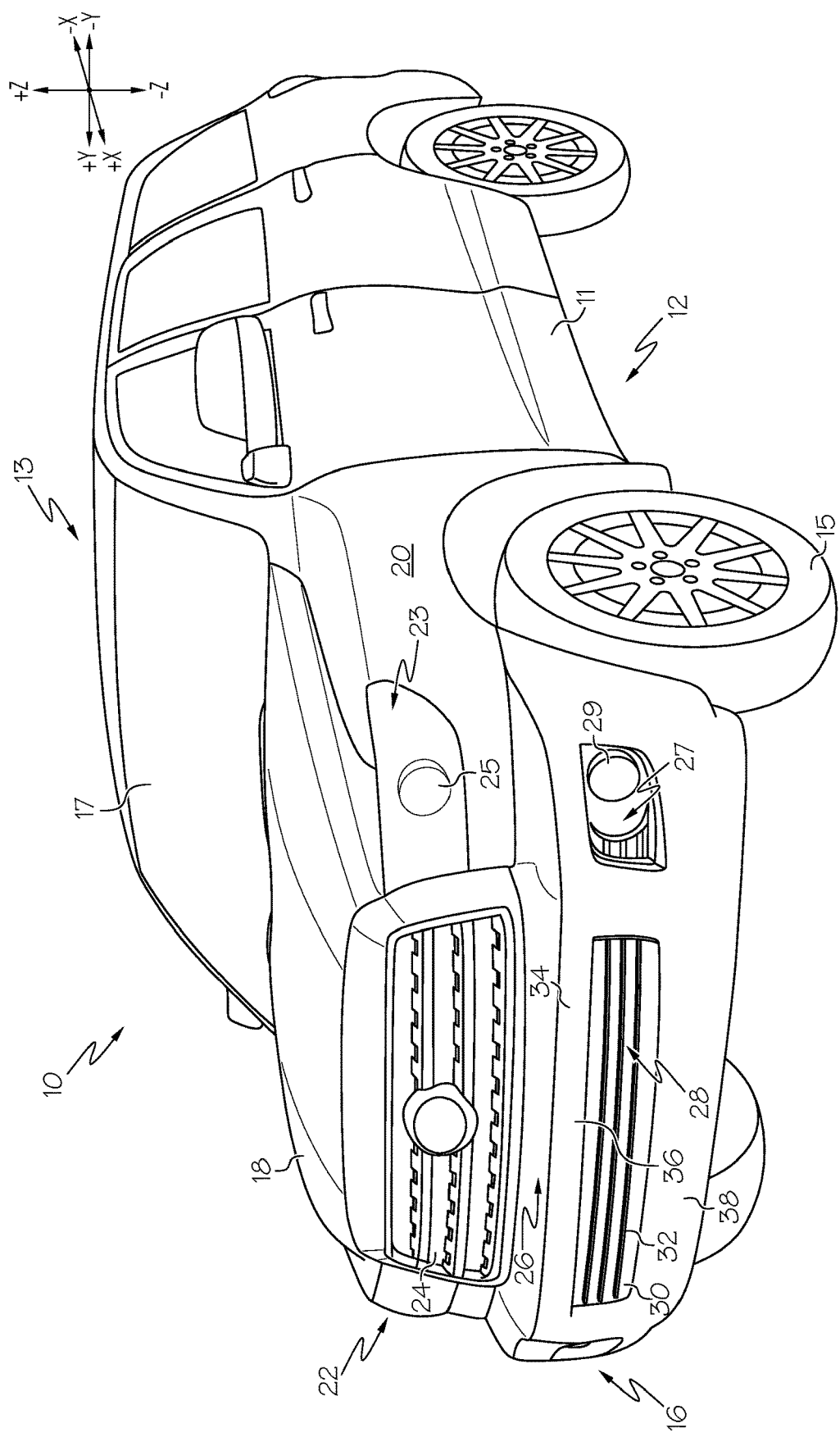
FIG. 1 schematically depicts a vehicle that includes a front end assembly and front bumper assembly, according to one or more embodiments shown and described herein.
Figure 2:
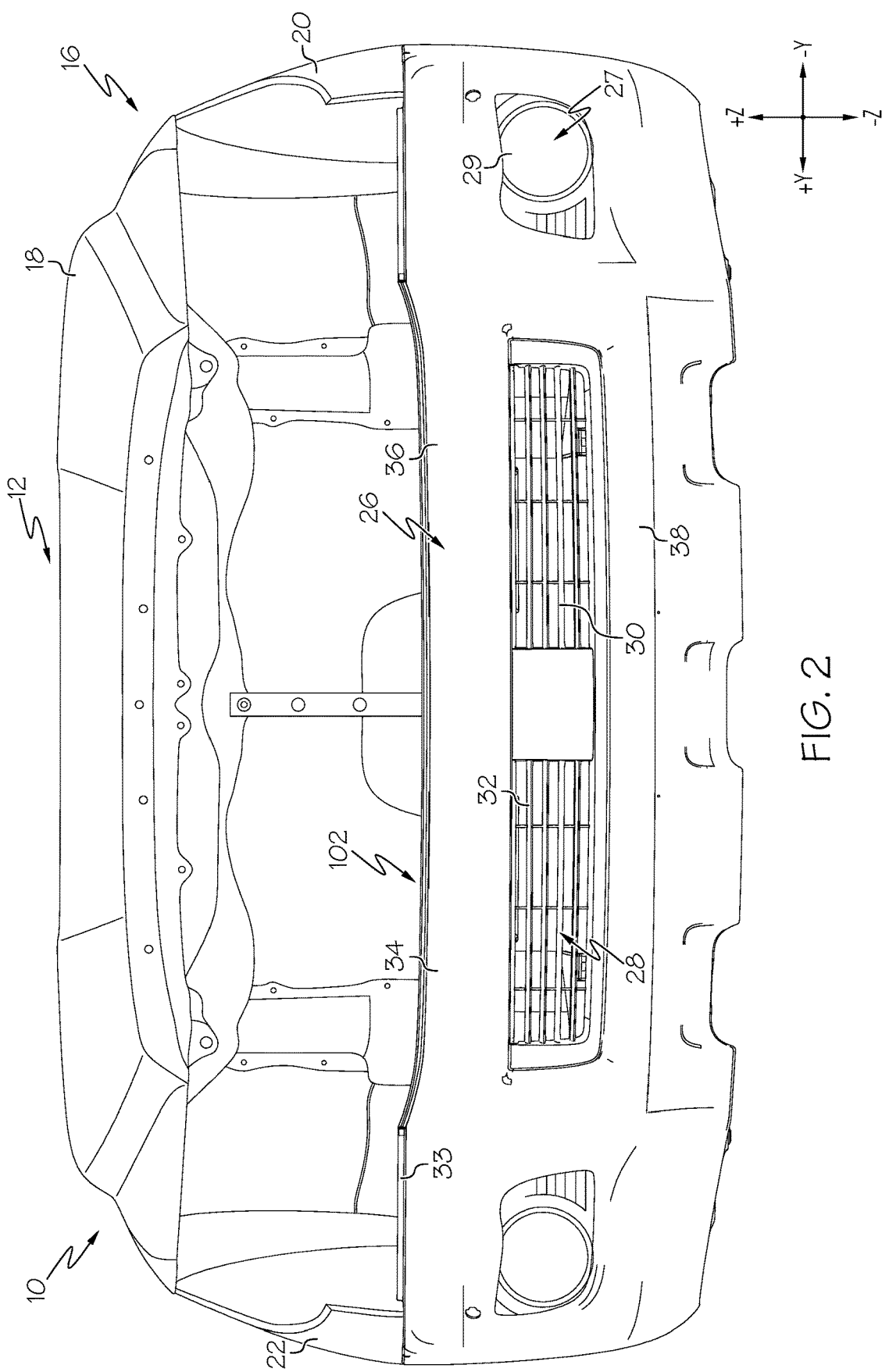
FIG. 2 schematically depicts a front view of the front bumper assembly of FIG. 1 with an upper grille assembly removed, according to one or more embodiments shown and described herein.

Referring initially to FIGS. 1 and 2, a vehicle 10 is depicted. The vehicle 10 includes a frame 12 onto which a vehicle drivetrain may be coupled. The vehicle 10 also includes a cabin 13 that may be part of the frame 12. The cabin 13 generally defines a passenger cabin of the vehicle 10. The vehicle 10 may include one or more doors 11, one or more wheels 15, and a windshield 17.

The vehicle 10 may further include a front end assembly 16 that includes a hood 18, front fenders 20 and 22, an upper grille assembly 24, a front bumper assembly 26, and a lower grille assembly 28 extending between the front fenders 20 and 22 in the vehicle lateral direction. The front end assembly 16 may also include one or more head light recesses 23 that surround one or more headlights 25 and the front bumper assembly 26 may further include one or more fog light recesses 27 surrounding one or more fog lights 29. Various components of the front end assembly 16 may be coupled to the frame, such as, for example, the upper grille assembly 24, the front bumper assembly 26, and the lower grille assembly 28. Components of the front end assembly 16 may couple to the frame 12 at one or more side support structures (not shown) or other various connection locations.

Generally, the lower grille assembly 28 includes a covering portion 30 with a number of horizontally disposed grille deflectors 32, a mesh or other suitable covering that protects a radiator behind the covering portion 30, while allowing air to flow past the covering and over the radiator. The front end assembly 16 includes an outer covering or bumper cover 34, an upper projecting bumper portion 36, and a lower projecting bumper portion 38 that under hangs the upper projecting bumper portion 36. The lower grille assembly 28 may be located between the upper projecting bumper portion 36 and the lower projecting bumper portion 38.

Figure 3A:
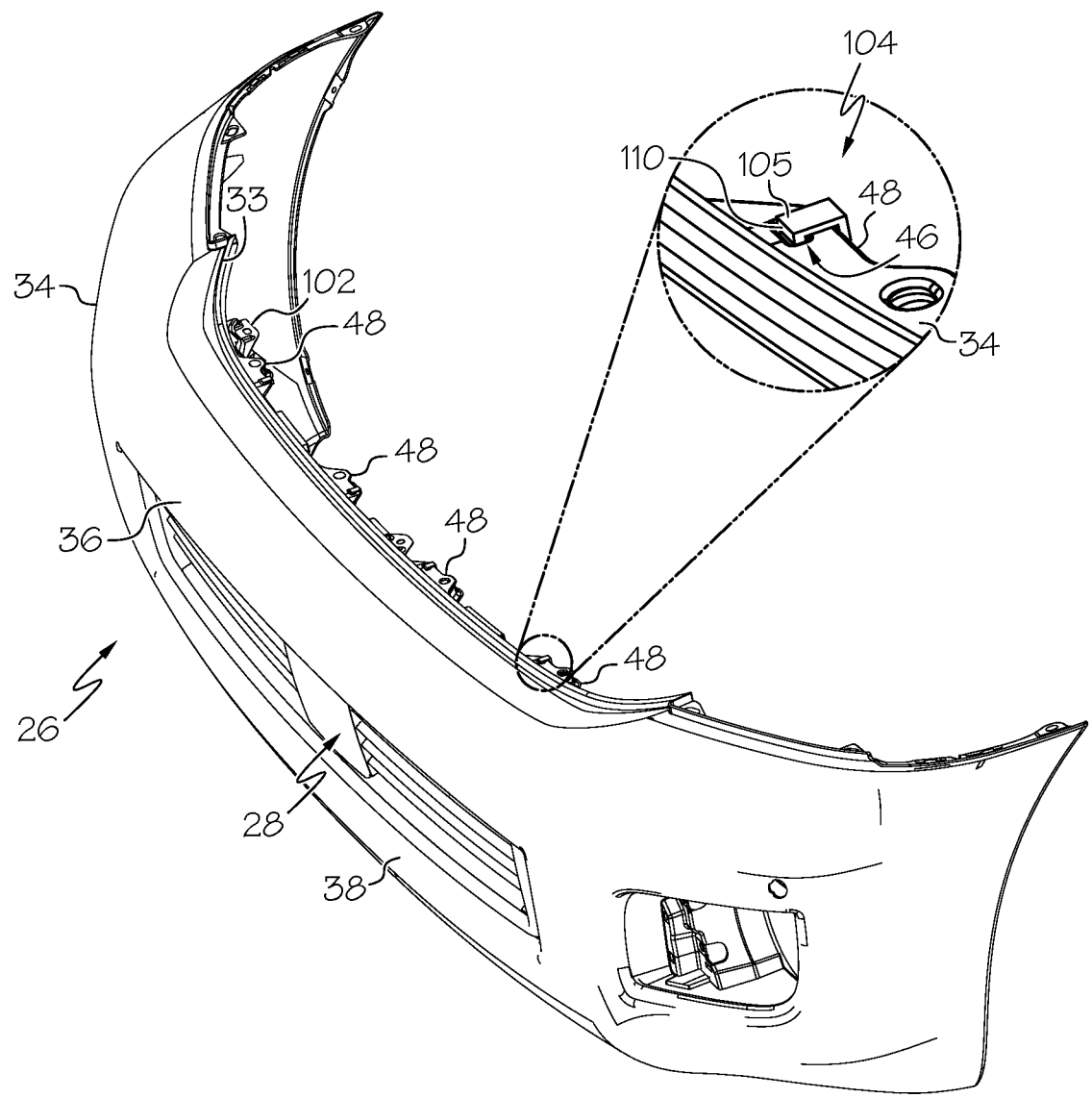
FIG. 3A schematically depicts an isometric view of the front bumper assembly of FIG. 1 including bumper cover and a bumper cover retainer and a zoomed in inset of a an integral clip, according to one or more embodiments shown and described herein.

Referring to FIGS. 3A and 3B, the bumper cover 34 may be an outer covering that is coupled to a bumper cover retainer 102. Referring back to FIGS. 1 and 2, one or more portions of each of the bumper cover 34, the lower grille assembly 28, and the bumper cover retainer 102 may be coupled to the frame 12 thereby affixing the bumper cover 34, the lower grille assembly 28, and the bumper cover retainer 102 to the frame 12.

During assembly of the vehicle 10, the bumper cover retainer 102 and the lower grille assembly 28 may be pieced together before mounting the bumper cover 34 to the bumper cover retainer 102 and the lower grille assembly 28. In some embodiments of the vehicle 10, during assembly, the bumper cover 34, lower grille assembly 28, and the bumper cover retainer 102 may be pieced together and then mounted to the frame 12. As shown in FIG. 2, the bumper cover 34, the lower grille assembly 28, and the bumper cover retainer 102 are mounted to the frame 12 of the vehicle 10.

FIG. 3A shows an isometric view of the front bumper assembly 26 of the vehicle 10 in isolation. The front bumper assembly 26 includes the lower grille assembly 28 and the bumper cover 34 including the upper projecting bumper portion 36 and the lower projecting bumper portion 38. One or more flanges 48 extend from the upper projecting bumper portion 36 in the vehicle rearward direction. The flanges 48 are substantially flat, planar projections that extend along discrete portions of the vehicle rearward edge of the upper projecting bumper portion 36 and may serve as coupling locations for the various fastening features described below in greater detail. In the particular embodiment shown, the bumper cover 34 includes four flanges 48 but embodiments are not so limited. It is contemplated that embodiments of the bumper cover 34 may comprise one, two, three, four, or more flanges 48.

Each flange 48 may comprise one or more cover openings 46. As shown in the inset of FIG. 3A, the cover opening 46 may generally be shaped as a rectangle with rounded corners, but may be any suitable shape. The cover opening 46 may comprise any size and any profile appropriate for inserting and retaining a fastener. Accordingly, the cover opening 46 provides a location to insert one or more portions of an integrally formed fastening feature for fastening the bumper cover retainer 102 to the bumper cover 34, as will be described in greater detail below.

Still referring to the inset of FIG. 3A, a particular embodiment of an integrally formed fastening feature is shown. As used herein, the term "integrally formed" refers to a fastening feature that is formed as a monolithic part and of the same material as the bumper cover retainer 102, such as through molding the fastening feature with the bumper cover retainer 102. Specifically, the integrally formed fastening feature may be an integral clip 104 that is part of the bumper cover retainer 102. In particular, the integral clip 104 is formed as an extension of the bumper cover retainer 102. In the position shown, a clip body 105 of the integral clip 104 extends in the vehicle forward direction along a portion of the flange 48 from the vehicle rearward edge of the flange 48 to the cover opening 46. The clip body 105 may surround a portion of the flange 48 and portions of the clip body 105, such as, for example, stem 110, may be retained within the cover opening 46, as will be described in greater detail below. This arrangement inhibits the bumper cover 34 from separating from the bumper cover retainer 102 during assembly and operation of the vehicle 10.

FIG. 3B shows the connection between the bumper cover retainer 102 and the bumper cover 34 in isolation from above the bumper cover retainer 102 and the bumper cover 34. The one or more flanges 48 extend rearwardly from the upper projecting bumper portion 36 of the bumper cover 34. The integral clips 104 retain the bumper cover 34 to the bumper cover retainer at the one or more cover openings 46. The bumper cover retainer 102 also includes one or more retainer fixing openings 101. The retainer fixing openings 101 fix the bumper cover retainer 102 to the frame 12 (not shown in FIG. 3B for simplification) or other portions of the vehicle, thereby permanently fixing the bumper cover 34 to the frame through the bumper cover retainer 102.

Figure 4:
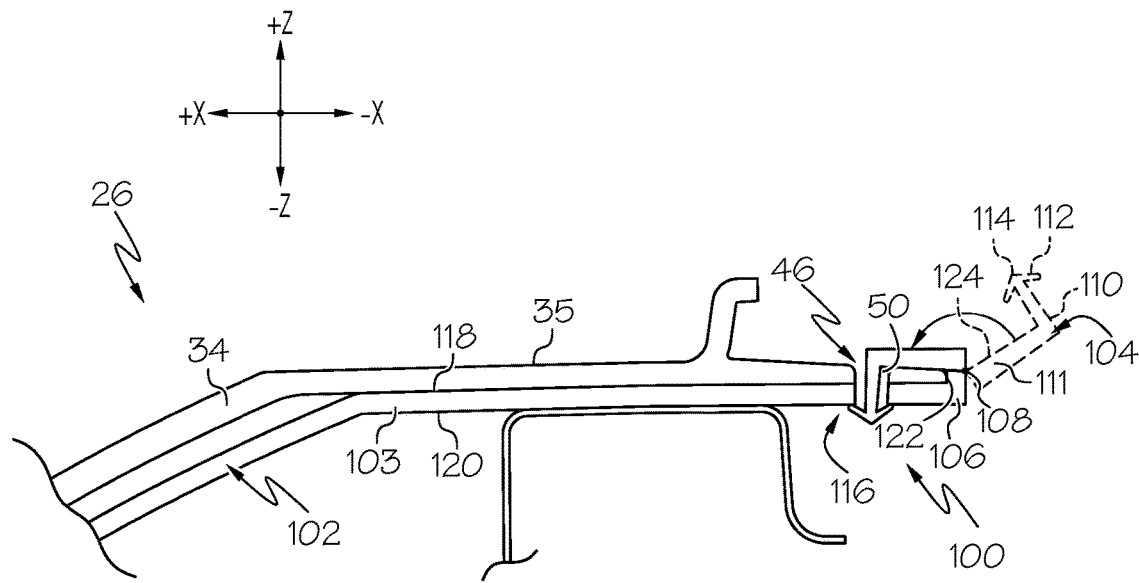
FIG. 4 schematically depicts a cross sectional side view of a bumper cover and a bumper cover retainer that includes an integral clip, according to one or more embodiments shown and described herein.

Referring to FIG. 4, the bumper retainer assembly 100 includes the bumper cover retainer 102 that may comprise a retainer opening 116, a main body 103 and one or more integrally formed fastening features, such as the integral clip 104. The integral clip 104 may be integral with the main body 103 of the bumper cover retainer 102 and be situated along a vehicle rearward edge 106 of the bumper cover retainer 102. The vehicle rearward edge 106 of the bumper cover retainer 102 may comprise a hinged connection 108 for hinged motion of the integral clip 104.

The hinged connection 108 may comprise a living hinge. A living hinge is a flexure bearing that is made from the same material as the two rigid pieces it connects. Thus, as the name suggests, the bumper cover retainer 102 and the integral clip 104 may be one continuous, integral piece formed of the same material. In some embodiments, the integral clip 104 is an integrally formed piece of molded plastic. As one non-limiting example, the bumper cover retainer 102 and the integral clip 104 may be formed from polypropylene. In some embodiments, the bumper cover retainer 102 and the integral clip 104 may be formed from high impact polypropylene. The hinged connection 108 may be thinned or cut along the hinge in order to provide a designated weak area to limit bending of the hinged connection to the thinned or cut portion, protecting areas of the bumper cover retainer 102 that are not designed to bend or fold from doing so.

The integral clip 104 may comprise a stem 110 that may include one or more barbs 112 that extend outwardly from the stem 110 at a point 114, extending downward and outward therefrom (with reference to the integral clip 104 in the fully extended position). The stem 110 may extend perpendicularly from the stem-side edge 111 of the integral clip 104 in the vehicle upward direction prior to being rotated about the hinged connection 108. The bumper cover retainer 102 may comprise a retainer opening 116 that may be aligned with or concentric with the cover opening 46 in the bumper cover 34. The bumper cover retainer 102 may further comprise a top surface 118 and a bottom surface 120.

The integral clip 104 may be rotatable about the hinged connection 108 through several positions. Prior to assembly and connection of the bumper cover retainer 102 and the bumper cover 34, the integral clip 104 may be in an original position that is fully extended from the main body 103 and oriented 180 degrees in the clockwise direction such that the main body 103 of the bumper cover retainer and the integral clip 104 form a common plane. During installation, the integral clip 104 may be rotated upward, counter clockwise about the hinged connection 108 as shown in FIG. 4 to an intermediate position with the barbs 112 of the stem 110 fully extended.

The integral clip 104 may continue to be rotated in the counter clockwise direction, toward the installed position, until the barbs 112 may eventually contact the inside surface that forms the periphery of the cover opening 46 in the bumper cover 34. At this point, the barbs 112 may bend inward about their connection to the stem 110 at point 114. The integral clip 104 may be in an intermediate position with the barbs 112 in a retracted position. The integral clip 104 may continue to be rotated counter clockwise about the hinged connection 108 until it is in a fully inserted position.

In the inserted position, as shown in FIG. 4, the entire vertical dimension of the length of the barb 112 is through both the cover opening 46 in the bumper cover 34 and the retainer opening 116 in the bumper cover retainer 102. In the inserted position, the barbs 112 return to an extended position and may comprise an interlock that inhibits removal of the stem 110 from the cover opening 46 in the bumper cover 34 and the retainer opening 116 in the bumper cover retainer 102. This in turn retains the bumper cover 34 to the bumper cover retainer 102.

Portions of the vehicle rearward edge 106 of the bumper retainer assembly 100 may comprise a shoulder 122 that raises the height of the hinged connection 108 to a point that may be above or parallel to a top surface 35 of the bumper cover 34. The height of the shoulder 122 may be sufficient to enable the integral clip 104 to rotate at the hinged connection 108 without interference from the bumper cover 34. The shoulder 122 may be dimensioned such that a top surface 124 of the integral clip 104 is substantially in contact with a rearward portion 37 of the bumper cover 34 when the stem 110 is in the inserted position, i.e., fastened inside the cover opening 46 of the bumper cover and the retainer opening 116 of the bumper cover retainer 102. Additionally, the stem 110, the barbs 112, and/or one or more other portions of the bumper cover 34 or the bumper cover retainer 102 may be dimensioned such that the barbs 112 may contact the bottom surface 120 of the bumper cover retainer 102 and thus may be under slight tension when the stem 110 is fully inserted in the cover opening 46 and the retainer opening 116. This may increase the friction between integral clip 104 and the bumper cover 34 to prevent unwanted relative motion between the bumper cover 34 and the bumper cover retainer 102. Tight dimensional tolerances may also prevent the bumper cover 34 from lifting from the top surface 118 of the bumper cover retainer 102.

Additionally, the length of the top surface 124 of the integral clip 104 may be dimensioned such that when the integral clip 104 is rotated about the hinged connection 108 and the stem 110 is inserted in the cover opening 46 in the bumper cover 34 and the retainer opening 116 in the bumper cover retainer 102, the stem 110, or portions thereof, contact at least a portion of a stem-contacting edge 50 in the cover opening 46 of the bumper cover 34. The contact between the stem 110 and the stem-contacting edge 50 may further prevent the bumper cover 34 from shifting with respect to the bumper cover retainer 102, for example in the vehicle longitudinal or vehicle lateral directions.

In some embodiments, the bumper cover retainer 102 may comprise additional interlocks. For example, in some embodiments, the bottom surface 120 of the bumper cover retainer 102 may comprise a lip (i.e., a raised portion) around the perimeter of the retainer opening 116. This lip may require forcing the stem 110 into the retainer opening 116 a greater depth until the ends of the barbs 112 are clear of the lip before the barbs 112 can be squeezed to the retracted position. When the stem 110 is pushed farther downward (in a counter clockwise direction as shown in FIG. 4), the barbs 112 clear the lip and the barbs can be squeezed inward toward the stem 110 and the stem 110 can be retracted from the cover opening 46 and the retainer opening 116. The bumper cover 34 can then be removed from the bumper cover retainer 102.

Figure 5:
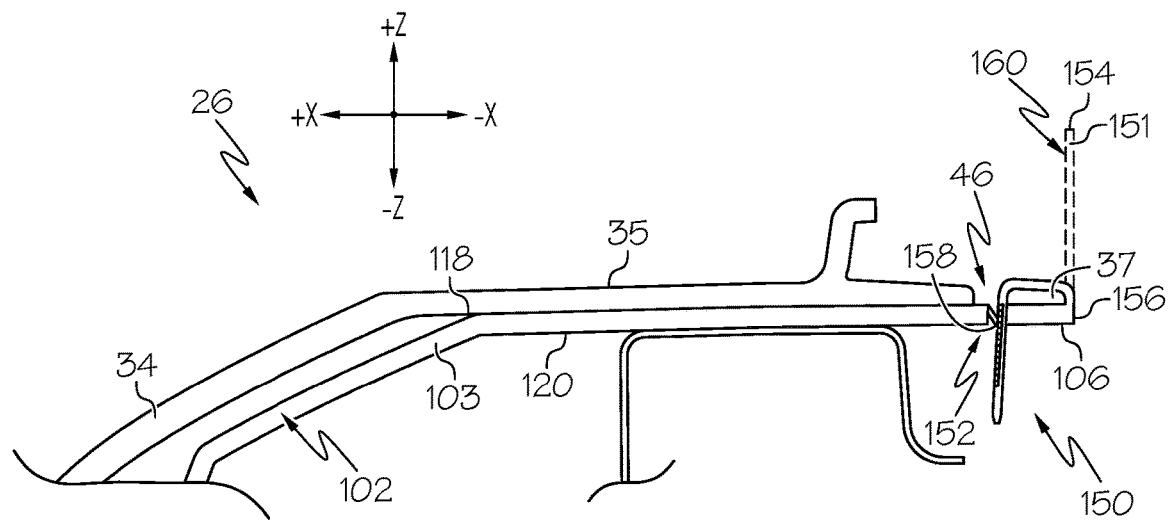
FIG. 5 schematically depicts a cross sectional side view of a bumper cover and a bumper cover retainer that includes an integral cable tie fastener, according to one or more embodiments shown and described herein.

FIG. 5 shows an example of an alternative embodiment for fastening the bumper cover 34 to the bumper cover retainer 102. The bumper cover 34 may include the cover opening 46 and the bumper cover retainer 102 may include a retainer opening 152, and an integral cable tie fastener 150. The integral cable tie fastener 150 may include a body 151 that extends between a free end 154 and a fixed end 156. Prior to installation, the free end 154 of the integral cable tie fastener 150 may project in the vehicle upward direction from the fixed end 156. The fixed end 156 may be joined to the bumper cover retainer 102 at the vehicle rearward edge 106 of the bumper cover retainer 102.

The integral cable tie fastener 150 may be a thin, pliable extension that includes at least one cable tie barb 158. The at least one cable tie barb 158 may extend downward and outward from the integral cable tie fastener 150 in a vehicle vertical and vehicle horizontal direction (with reference to the free end 154 being in an extended position as shown by the dashed lines in FIG. 4). Additionally, the diameter of the retainer opening 152 may be less than the horizontal extension of the cable tie barb 158 from the integral cable tie fastener 150.

The free end 154 may be folded downward and through the cover opening 46 in the bumper cover 34 and the retainer opening 152 in the bumper cover retainer 102. In the particular embodiment shown, the integral cable tie fastener 150 may be folded in the counter-clockwise direction, but embodiments are not so limited. The integral cable tie fastener 150 may be folded until the free end 154 enters the cover opening 46 and the retainer opening 152. The cable tie barb 158 may be compressed and elastically deformed by the diameter of the retainer opening 152 as the free end 154 is pulled downward because the diameter of the retainer opening 152 may be less than the horizontal extension of the cable tie barb 158. Once the integral cable tie fastener 150 is pulled downward through the retainer opening 152 sufficiently such that the cable tie barb 158 is clear of the perimeter of the retainer opening 152, the cable tie barb 158 extends outward and the integral cable tie fastener 150 cannot be removed from the retainer opening 152 without compressing the cable tie barb 158 such that its horizontal component dimension is small enough to fit inside the perimeter of the retainer opening 152. In this way, the cable tie barb 158 prevents removal of the integral cable tie fastener 150 from the retainer opening 152 and the cover opening 46 and, by extension, prevents removal of the bumper cover 34 from the bumper cover retainer 102.

The integral cable tie fastener 150 may include additional interlocks that prevent its removal from the retainer opening 152 in addition to the cable tie barb 158. For example, the cable tie barb 158 may be prevented from being compressed once the cable tie barb 158 is completely through the retainer opening 152 by a lip around the perimeter or portions of the perimeter of the retainer opening 152 that locks the cable tie barb 158 in the installed position. Such a lip may require pulling the integral cable tie fastener 150 further into the retainer opening 152 before removal, for example, far enough such that the cable tie barb 158 clears the lip and can be compressed before removing the integral cable tie fastener 150 from the retainer opening 152 in the bumper cover retainer 102 and the cover opening 46 in the bumper cover 34. Because the bumper cover 34 cannot be removed from the bumper cover retainer 102 while the cable tie barb 158 is installed, the lip may help keep the bumper cover 34 in place.

Additionally, in some embodiments, the integral cable tie fastener 150 may include a plurality of cable tie barbs 158 along the length of the integral cable tie fastener 150, for example, the integral cable tie fastener 150 may include two or more cable tie barbs. This may permit a user to ratchet the integral cable tie fastener 150 to tighten the connection between the bumper cover 34 and the bumper cover retainer 102. Tightening the connection between the bumper cover 34 and the bumper cover retainer 102 may prevent unnecessary motion or vibration between the bumper cover 34 and the bumper cover retainer 102. For example, in some embodiments of the bumper cover retainer 102 that include the integral cable tie fastener 150, the integral cable tie fastener 150 may be pulled tightly enough and ratcheted downward through the retainer opening 152 such that an inside face 160 of the integral cable tie fastener 150 may be in contact with a rearward portion 37 of the bumper cover 34. Contact between the integral cable tie fastener 150 and the top surface 35 of the bumper cover 34 may prevent undesired motion between the bumper cover 34 and the bumper cover retainer 102 such as shifting or sliding during installation and use of the front end assembly 16 and the vehicle 10. As used herein, "ratchet" or "ratcheted" generally refers to the interaction of inclined teeth (such as the at least one cable tie barb 158) engaging a pawl (such as the perimeter of the retainer opening 152) or similar structure that results in one-way motion, with reverse motion being prevented.

In some embodiments, the integral cable tie fastener 150 may be positionable between one or more positions. For example, the integral cable tie fastener 150 may positionable between a primary position, an intermediate position, and an installed position. In the primary position, the integral cable tie fastener 150 may extend upwardly from the vehicle rearward edge 106 of the bumper cover retainer 102. In the intermediate position, the free end 154 of the integral cable tie fastener 150 is folded over the rearward portion 37 of the bumper cover 34 but may not yet been fully inserted into the cover opening 46 and the retainer opening 152. In the installed position the free end 154 of the integral cable tie fastener 150 is folded over the rearward portion 37 of the bumper cover 34 and through the cover opening 46 and the retainer opening 152, and the cable tie barb 158 is extended completely through the retainer opening 152 and the cover opening 46 such that the cable tie barb 158 is fully extended and prevents removal of the integral cable tie fastener 150 from the retainer opening 152 and the cover opening 46, thereby preventing removal of the bumper cover 34 from the bumper cover retainer 102.

It should now be understood that vehicles according to the present specification include a frame and front end assembly that includes a front bumper assembly with a bumper cover and a bumper cover retainer. The bumper cover and the bumper cover retainer may extend in a vehicle-lateral direction across the front end assembly. The bumper cover retainer may be disposed behind the bumper cover and may fasten the bumper cover to the front bumper assembly. The bumper cover retainer may include one or more features for removably fastening the bumper cover to the bumper cover retainer, for example, one or more integrally formed fastening features. The one or more integrally formed fastening features may be integral with the bumper cover retainer and foldable from an extended position to an inserted position. The one or more fastening features may also comprise one or more features for selectively preventing removal of the fastening feature that may prevent undesired removal of the fastening feature and thus prevent undesired decoupling of the bumper cover retainer and the bumper cover. Thus, vehicles according to the present disclosure may provide a convenient, practical, and cost-effective feature for joining various components of the vehicle while it is being assembled, saving time and money and for keeping the components together once they are assembled.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is also noted that recitations herein of "at least one" component, element, etc., should not be used to create an inference that the alternative use of the articles "a" or "an" should be limited to a single component, element, etc. For example, "at least one cable tie barb" should not be used to create an inference that the alternative use of "a cable tie barb" creates an inference of singularity.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A vehicle comprising:
a bumper assembly comprising:
a bumper cover, and
a bumper cover retainer, wherein
the bumper cover retainer includes an integrally formed fastening feature that is integral with the bumper cover retainer and that folds over the bumper cover and into a cover opening and a retainer opening to connect the bumper cover to the bumper cover retainer.

2. The vehicle of claim 1, wherein:
the bumper cover comprises the cover opening and the bumper cover retainer comprises the retainer opening and at least a portion of each of the cover opening and the retainer opening are aligned in the vertical direction, and
the integrally formed fastening feature is dimensioned such that when the integrally formed fastening feature is folded over the bumper cover a portion of the integrally formed fastening feature extends into the retainer opening and the cover opening.

3. The vehicle of claim 2, wherein the integrally formed fastening feature is an integral clip that comprises:
a clip body that is coupled to and extends from a rearward edge of the bumper cover retainer;
a stem that extends perpendicularly from the clip body at a stem-side edge of the clip body;
one or more barbs that extend outward from the stem; and
a point where the one or more barbs connect to the stem, wherein
the integral clip is moveable between one or more positions comprising:
a fully extended position wherein the integral clip extends in the vehicle rearward direction from the rearward edge of the bumper cover retainer and parallel to the bumper cover;
an inserted position wherein the one or more barbs are fully inserted into the cover opening and the retainer opening; and
an intermediate position between the fully extended position and the inserted position.

4. The vehicle of claim 3, wherein the integral clip is fixedly and hingedly coupled to the bumper cover retainer at a hinged connection.

5. The vehicle of claim 4, wherein the hinged connection is a living hinge.

6. The vehicle of claim 2, wherein the integrally formed fastening feature is an integral cable tie fastener that comprises a body that extends upwardly from a rearward edge of the bumper cover retainer between a free end and a fixed end.

7. The vehicle of claim 6, wherein the integral cable tie fastener comprises a cable tie barb that extends outwardly from the body of the cable tie fastener.

8. The vehicle of claim 7, wherein the integral cable tie fastener is positionable between one or more positions comprising:
a primary position wherein the integral cable tie fastener extends upwardly from the rearward edge of the bumper cover retainer;
an intermediate position wherein the free end of the integral cable tie fastener is folded over the bumper cover; and
an installed position wherein the free end of the integral cable tie fastener is folded over the bumper cover and through the cover opening and the retainer opening, and the cable tie barb is through the retainer opening and the cover opening such that the cable tie barb is fully extended and prevents removal of the integral cable tie fastener from the retainer opening and the cover opening.

9. The vehicle of claim 8, wherein the retainer opening and the cover opening have perimeters that are substantially the same shape and are aligned.

10. The vehicle of claim 8, wherein the integral cable tie fastener comprises two or more cable tie barbs such that the free end of the integral cable tie fastener can be pulled to ratchet the integral cable tie fastener in the retainer opening and the cover opening.

11. A bumper assembly comprising:
a bumper cover, and
a bumper cover retainer, wherein
the bumper cover retainer includes an integrally formed fastening feature that is integral with the bumper cover retainer and that folds over the bumper cover and into a cover opening and a retainer opening to connect the bumper cover to the bumper cover retainer.

12. The bumper assembly of claim 11, wherein:
the bumper cover comprises the cover opening and the bumper cover retainer comprises the retainer opening and at least a portion of each of the cover opening and the retainer opening are aligned in the vertical direction, and
the integrally formed fastening feature is dimensioned such that when the integrally formed fastening feature is folded over the bumper cover a portion of the integrally formed fastening feature extends into the retainer opening and the cover opening.

13. The bumper assembly of claim 12, wherein the integrally formed fastening feature is an integral clip that comprises:
a clip body that is coupled to and extends from a rearward edge of the bumper cover retainer;
a stem that extends perpendicularly from the clip body at a stem-side edge of the clip body;
one or more barbs that extend outward from the stem; and
a point where the one or more barbs connect to the stem, wherein
the integral clip is moveable between one or more positions comprising:
a fully extended position wherein the integral clip extends in the vehicle rearward direction from the rearward edge of the bumper cover retainer and parallel to the bumper cover;
an inserted position wherein the one or more barbs are fully inserted into the cover opening and the retainer opening; and
an intermediate position between the fully extended position and the inserted position.

14. The bumper assembly of claim 13, wherein the integral clip is fixedly and hingedly coupled to the bumper cover retainer at a hinged connection.

15. The bumper assembly of claim 14, wherein the hinged connection is a living hinge.

16. The bumper assembly of claim 12, wherein the integrally formed fastening feature is an integral cable tie fastener that comprises a body that extends upwardly from a rearward edge of the bumper cover retainer between a free end and a fixed end.

17. The bumper assembly of claim 16, wherein the integral cable tie fastener comprises a cable tie barb that extends outwardly from the body of the integral cable tie fastener.

18. The bumper assembly of claim 17, wherein the integral cable tie fastener is positionable between one or more positions comprising:
- a primary position wherein the integral cable tie fastener extends upwardly from the rearward edge of the bumper cover retainer;
- an intermediate position wherein the free end of the integral cable tie fastener is folded over the bumper cover; and
- an installed position wherein the free end of the integral cable tie fastener is folded over the bumper cover and through the cover opening and the retainer opening, and the cable tie barb is through the retainer opening and the cover opening such that the cable tie barb is fully extended and prevents removal of the integral cable tie fastener from the retainer opening and the cover opening.

19. A method of retaining a bumper cover to a bumper cover retainer comprising:
- placing the bumper cover and the bumper cover retainer in contact;
- folding an integrally formed fastening feature of the bumper cover retainer over the bumper cover and into a cover opening and a retainer opening to connect the bumper cover to the bumper cover retainer.

20. The method of claim 19 further comprising inserting a barb of the integrally formed fastening feature through the cover opening and into the retainer opening thereby fastening the bumper cover to the bumper cover retainer.

* * * * *